March 20, 1928. 1,662,870
C. W. STANCLIFFE
GROOVED PLATE HEAT INTERCHANGER
Filed Oct. 9, 1924  2 Sheets-Sheet 1

Inventor
C. W. Stancliffe
by Wright, Brown, Quinby & Ivey
Att'ys.

March 20, 1928.

C. W. STANCLIFFE

GROOVED PLATE HEAT INTERCHANGER

Filed Oct. 9, 1924

Inventor:
C. W. Stancliffe.
by Wright, Brown, Quinby & May,
Attys.

Patented Mar. 20, 1928.

1,662,870

UNITED STATES PATENT OFFICE.

CECIL W. STANCLIFFE, OF STAMFORD, CONNECTICUT, ASSIGNOR TO STANCLIFFE ENGINEERING CORPORATION, OF NEW YORK, N. Y., A CORPORATION OF NEW YORK.

GROOVED-PLATE HEAT INTERCHANGER.

Application filed October 9, 1924. Serial No. 742,554.

The present invention relates to heat interchanger units of the general type disclosed in prior patent applications made by me, distinguished by the fact that passageways for fluids of different temperatures are formed in blocks of solid metal or other suitable heat conducting material, there being a solid mass of such material around and between the fluid-conducting passages. It is the object of the present invention to provide a unit of this type which is made of plates assembled together in a solid block, and in which the passageways for the fluids are provided by grooves suitably formed in the plates in one or both sides thereof. Such grooves may be made by machining plates with the use of milling cutters of proper form and arrangement, or they may be made by casting or molding or in any other way which is now or may hereafter be found suitable. Units made in this manner may be produced at low cost for material and labor, both in constructing the individual plates and in assembling them into the complete unit.

In the specification, and in the drawings provided to illustrate the same, I have described and illustrated the preferred form of my invention.

In the drawings.

Like reference characters designate the same parts wherever they occur in all the figures.

In the following description I will generally refer to the subject of this invention as a heater, using this term in the interest of brevity and without intending thereby to imply any limitations in the uses to which the articles embodying the invention may be put or in the scope of the protection which I claim. Such so-called heater is designed and intended for effecting transfer of heat from one fluid to another, whether the fluids are both liquids, gases or vapors, or one is a liquid and the other a gas or vapor and whether the purpose is to heat one fluid by thermal contact with a hotter fluid or to cool one of the fluids by thermal contact with a cooler one.

This heater is made up of a pile or stack of superposed plates $a$, $b$ arranged in repeated alternation. In one face of each of the plates $a$ are parallel grooves $c$, and in one face of each of the plates $b$ are parallel grooves $d$. These plates and grooves are essentially like one another but inasmuch as the adjacent plates are so placed that the grooves in each run crosswise of those in the next adjacent plates, I have designated those plates in which all of the grooves run in one direction by the letter $a$, and the plates in which the grooves run in a different direction by the letter $b$. These plates are laid one upon another with the ungrooved or plain side of each plate covering the open sides of the grooves in the adjacent plate, and thus in the assembled unit the grooves formed enclose passageways of which all but one side are formed by the material of the plate in which they are cut, and the remaining side is formed by the ungrooved surface of the adjacent plate. An ungrooved end plate $e$ is applied over the grooves in the endmost plate of the unit, this being the bottom plate in the view of the unit shown in Fig. 1. Said end plate may be of any desired thickness. A similar plate $e'$ of greater or less thickness may if desired be placed at the top or opposite end of the heater to reinforce the grooved plate $a$ at this end.

Figure 1:
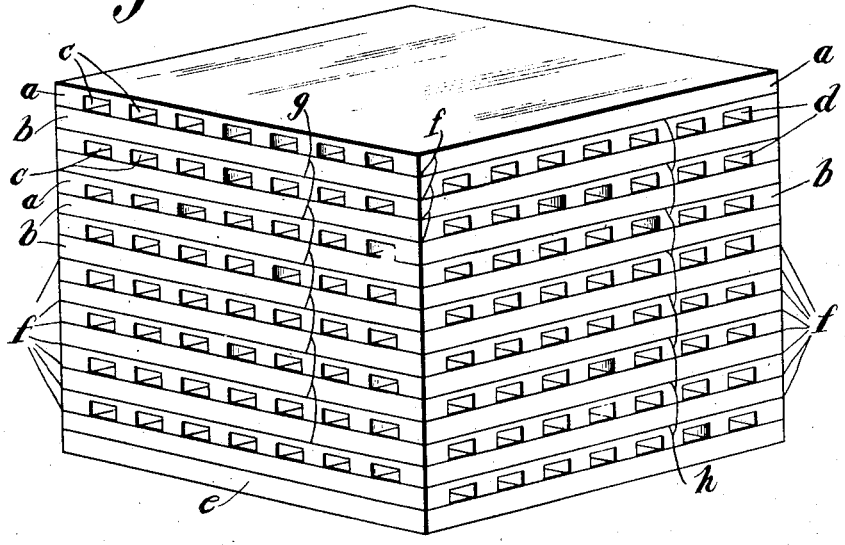
Figure 1 is a perspective view of a collection or stack of grooved plates forming the core of a unit containing the preferred form of the invention.
Figure 2:
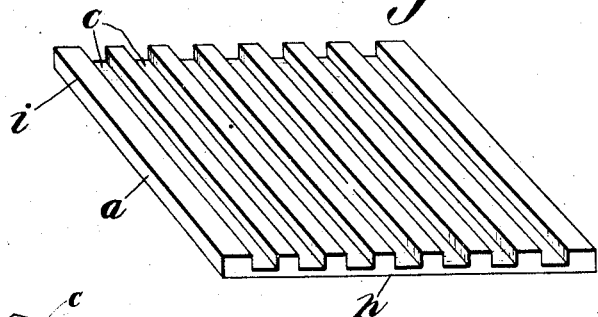
Fig. 2 is an inverted perspective view of one of the plates which is combined with other plates to produce the stack shown in Fig. 1.

The assembled plates may be secured together in a substantially solid block by various ways or means, preferably by welding them all together at the corners of the unit as at $f$, and welding the seams as at $g$ and $h$, (Fig. 1). The seams thus welded are the joints between contiguous edges of the plates which are not interrupted by grooves. Calling the grooved face of any plate its front face, and the ungrooved face its back, these uninterrupted edges are found at all of the boundaries of the back face and at those edges of the front face which are parallel with the grooves. In Fig. 2 such edges are designated $h$ and $i$ respectively. An edge of each plate corresponding to $h$ comes adjacent to an edge corresponding to $i$ of the next adjacent plate, and it is the seams between these adjacent edges which are closed by welding. Of course the entire surface of the contact between contiguous plates may be united by welding, soldering or otherwise, or they may be packed by interposed gaskets, etc.; but closing of the seams hereinabove specified is sufficient to prevent leakage of the fluid from the passageways of one plate to those of the adjacent plate.

In connection with welding the corners and edges, the block or stack may be braced and reinforced to give strength against bursting or separation of the plates, by bolts $j$, (Fig. 4), passing through the unit between the passageways or by rigid end plates or frames of other specific forms than the plates $e$ and $e'$ mounted against the ends of the unit and secured together.

Figure 5:
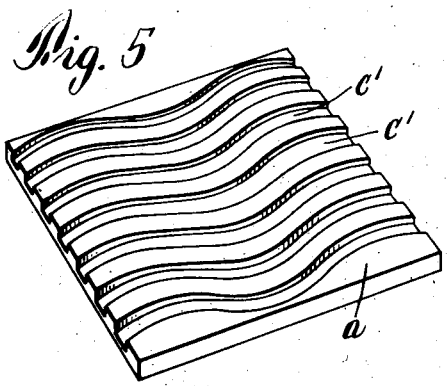
Fig. 5 is a view similar to Fig. 2 showing a plate with curved grooves.

It is obvious that the grooves may be made of any dimensions and of any desired transverse outline, depending on the shape of the tool used for cutting them and upon their spacing. Moreover, while they are preferably straight from end to end, they are not necessarily so, but may be made with a serpentine or undulatory course such as grooves $c'$ shown in Fig. 5, or may be otherwise curved. Whatever may be the precise direction which these grooves take, all of the grooves $c$, $c'$, etc. in the plates $a$ run in substantially the same general direction, and form one set of passageways, while all the grooves $d$ in the plates $b$ run in substantially the same direction transverse to the grooves $a$ and form another set of passageways.

Figure 4:
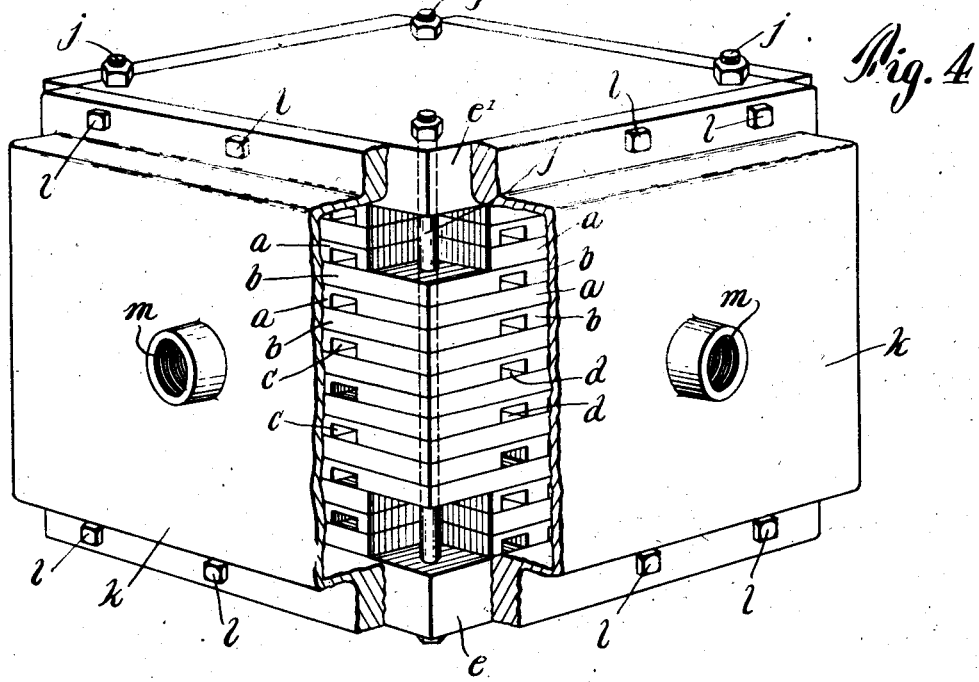
Fig. 4 is a perspective view of a complete unit consisting of the above mentioned collection of plates and external fittings, said fittings being partly broken away and certain of the plates also being broken away to disclose a connecting bolt.

The stack or block of plates thus made forms what may be called the core of the complete unit; and such unit is completed by the combination of external fluid connections or fittings with the core. Figure 4 shows one form of such external fitting similar to the corresponding part shown in my prior Patent No. 1,571,068, dated January 26, 1926, consisting of recessed plates $k$, $k$, applied to the block over those faces thereof through which the grooves or passageways open, and secured to the end plates $e$, $e'$ by bolts $l$, or equivalent fastening means. The edges or flanges of said recessed plates $k$ make contact with the end plates of the block and with the corner portions of the grooved plates outside of the outermost rows of grooves therein and are suitably packed to prevent leakage; the recesses within said edges providing chambers into which the grooves open. Said grooved plates or fittings have suitable nipples, or equivalent means $m$ for connection of pipes to lead fluid to or from the grooves or passages. It is to be understood that the opposite faces of the block are provided with similar fittings to those shown on the visible faces in Figure 4.

Among the uses to which units of this construction are admirably adapted is that of steam condensers in which there is no substantial pressure. It may be applied to all other heating or cooling purposes, however.

All of the advantages due to the presence of solid material having high heat conductivity between passages containing fluids of different temperatures, are present in this unit. In addition there are present the structural and manufacturing advantages due to the grooved plates. Such plates may be procured of convenient thickness and uniform thickness, and may be quickly grooved at low cost by the use of milling cutters arranged in gangs. In case plates are specially prepared for this purpose the grooves may be formed in them during manufacture, as by rolling them in; or by casting or molding them when a material is used which is susceptible of being cast with sufficiently smooth surfaces and sharp edges. I may use any metal suitable for the purpose, or possibly also such non-metals as have sufficient heat conducting capacity.

Figure 3:
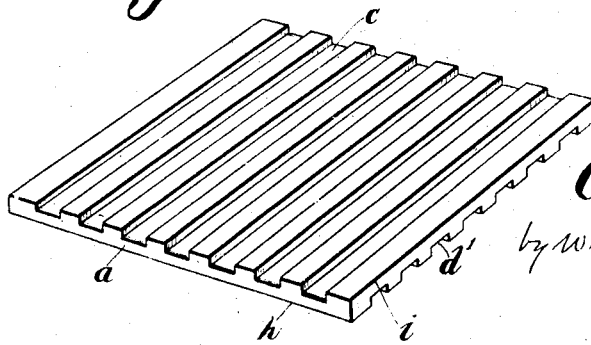
Fig. 3 is a perspective view of such a plate having grooves in opposite faces.
Figure 6:
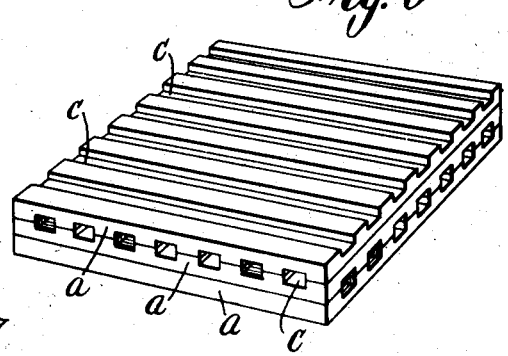
Fig. 6 is a perspective view illustrating a possible arrangement of grooved plates arranged face to face.
Figure 7:
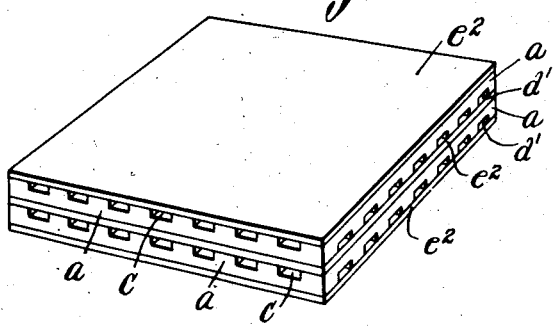
Fig. 7 is a perspective view illustrating a possible mode of building up plates grooved on both sides, as shown in Fig. 3, with interspersed ungrooved plates.

The plates may also be formed with grooves in opposite faces, that is with grooves $c$ extending in one direction parallel to one another in one of the faces and grooves $d'$ in the opposite face extending parallel to one another but in a direction transverse to that of the grooves $c$. That is the grooves in the single plate shown in Figure 3 combine one row or rank of passageways of both sets. Plates of this sort may be combined with similar plates face to face so that the complete passageways are partly formed in both of two contiguous plates, as shown in Figure 6, or they may be built up in alternation with plain plates $e^2$ shown in Figure 7 intermediate each two grooved plates; all united together substantially as above described.

Those plates which are grooved in one face only may be placed together face to face in a similar manner in order to make passageways of depth greater than the grooves, and pairs of plates so arranged may be built up to form a complete block in the same manner, as will be clearly understood from the foregoing explanation.

What I claim and desire to secure by Letters Patent is:

1. A heat interchanger unit composed of a stack of plates having open grooves in one face and so combined together that passageways are formed between the assembled plates, certain passageways running in one direction and in alternation with other passageways running in a different direction, and connections applied to said stack for conduction of fluid to and from said passageways.

2. A heat interchanger unit comprising a series of plates assembled together in a block, said plates having grooves in one face running in substantially the same direction and being so arranged that the grooves of certain plates run crosswise of those in other plates and are closed at one side by the adjacent plates, and fluid conducting connections applied to said block.

3. A series of plates assembled into a solid block to form the core of a heat interchanger, the said plates having grooves in one face running from one edge to the opposite edge and the open sides of such grooves being closed by adjacent plates.

4. A series of plates assembled into a solid block to form the core of a heat interchanger, the said plates having grooves in one face running from one edge to the oppo site edge and the open sides of such grooves being closed by adjacent plates, the seams at the edges of the adjacent plates being closed to prevent leakage from or to the passageways formed by said grooves.

5. A series of plates assembled into a solid block to form the core of a heat interchanger, the said plates having grooves in one face running from one edge to the opposite edge and the open sides of such grooves being closed by adjacent plates, the plates being welded together at their corners and along the seams between adjacent edges.

6. A structural element for a heater unit of the class described comprising a plate having substantially parallel grooves formed in one of its faces and extending all the way across from edge to edge thereof.

7. A structural element for a heater unit of the class described comprising a plate having substantially parallel grooves formed in one of its faces and having another set of grooves formed in its opposite face, the last named grooves being substantially parallel to one another but transverse to those first named.

8. A heat interchanger consisting of a block formed of grooved plates placed upon one another in a stack in such manner that the several plates close the open sides of the grooves in adjacent plates, and alternate sets of grooves run in directions transverse to the adjacent intermediate grooves, said grooves opening at their opposite ends in opposite sides of the block, and external fittings applied to said block over the faces thereof in which said grooves open, said fittings having internal spaces closed on all sides except the side next to the block, and there communicating with the grooves which open at the adjacent side of the block.

In testimony whereof I have affixed my signature.

CECIL W. STANCLIFFE.